Dec. 6, 1960  S. A. MATTSON ET AL  2,963,018
STONE-SAWING MACHINES
Filed Oct. 29, 1957  2 Sheets-Sheet 1

INVENTORS
SVEN AXEL MATTSON,
ARNOLD VALFRID KARLSSON
AND JOHAN NILSSON
BY Linton and Linton
ATTORNEYS Dec. 6, 1960  S. A. MATTSON ET AL  2,963,018
STONE-SAWING MACHINES
Filed Oct. 29, 1957  2 Sheets-Sheet 2
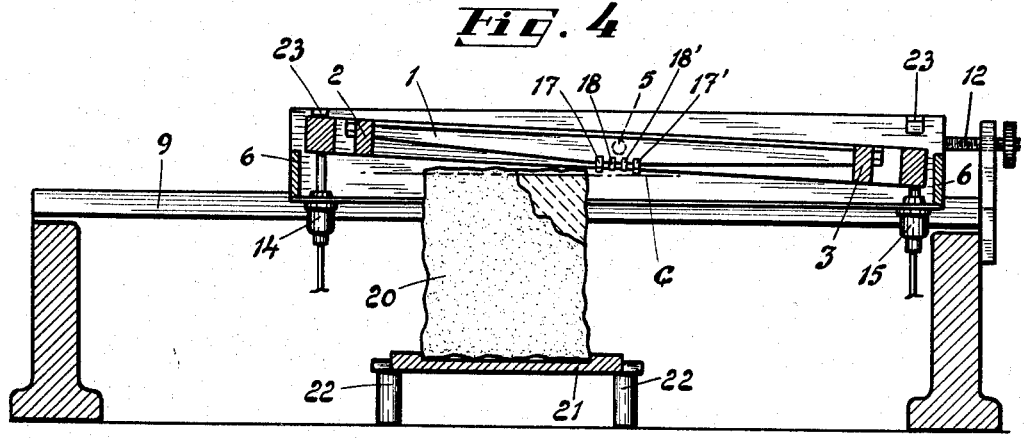
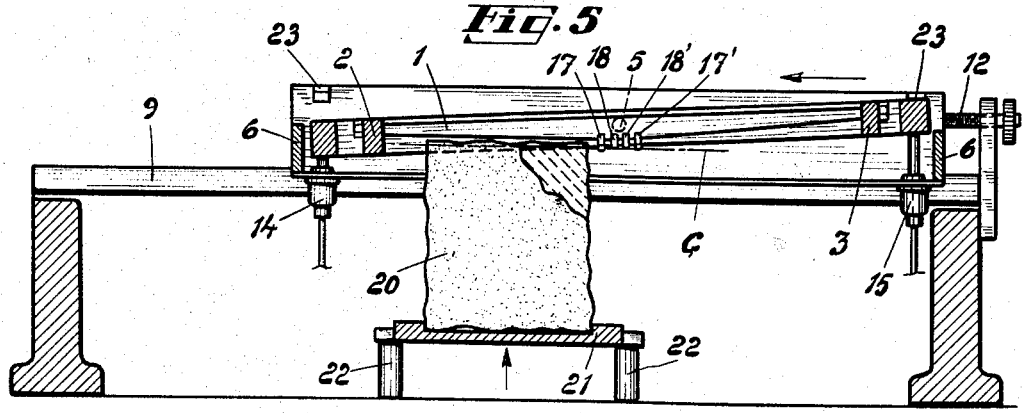
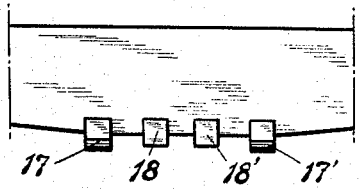
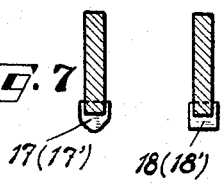
INVENTOR.
SVEN AXEL MATTSON,
ARNOLD VALFRID KARSSON,
AND JOHAN NILSSON
By Linton and Linton, ATTORNEYS

United States Patent Office 2,963,018
Patented Dec. 6, 1960

2,963,018

STONE-SAWING MACHINES

Sven Axel Mattson, Goteborg, Arnold Valfrid Karlsson, Lysekil, and Johan Nilsson, Goteborg, Sweden, assignors to Skandinaviska Granit Aktiebolaget, Goteborg, Sweden Filed Oct. 29, 1957, Ser. No. 693,142

2 Claims. (Cl. 125—16)

The present invention relates to stone-sawing machines of the kind in which a number of saw blades parallel to each other and disposed in parallel vertical planes are mounted, in a frame with their ends secured to the end members of said frame, which is movable to and fro horizontally and in parallel with said vertical planes of the saw blades.

More specifically, the invention relates to such machines of the above-mentioned kind in which each saw blade is provided with two sets of hard-metal cutter teeth so arranged, that one of said sets engages the workpiece when the frame is moving in one direction and the other set engages the workpiece when the frame is moving in the opposite direction.

The object of the invention is to provide a stone-sawing machine of the kind set forth which will make it possible to cut all kinds of stone, even the harder ones, such as granite, more rapidly than hitherto possible and with comparatively low power consumption and also without the use of any abrasive agent.

The invention is mainly characterized by the fact that said saw-blade frame is mounted in a horizontal supporting frame relative to which it is rockable between two stop positions about a pivotal axis disposed transversely of the saw blades and halfway between the end members of the saw-blade frame, said supporting frame being arranged to perform a reciprocating movement along horizontal guides, the length of each stroke being adjustable relative to the size of the workpiece, that at the end of each stroke all of said cutter teeth are completely moved out of the ends of the grooves cut in the workpiece by said teeth, means further being provided for transferring the saw-blade frame from one stop position to the other at each of the turning points of the supporting frame, while the cutter teeth are not engaging the workpiece.

The means for transferring the saw-blade frame from one stop position to the other may consist of hydraulic jacks disposed adjacent the ends of the saw-blade frame and arranged to act between the saw-blade frame and the supporting frame.

Figure 1:
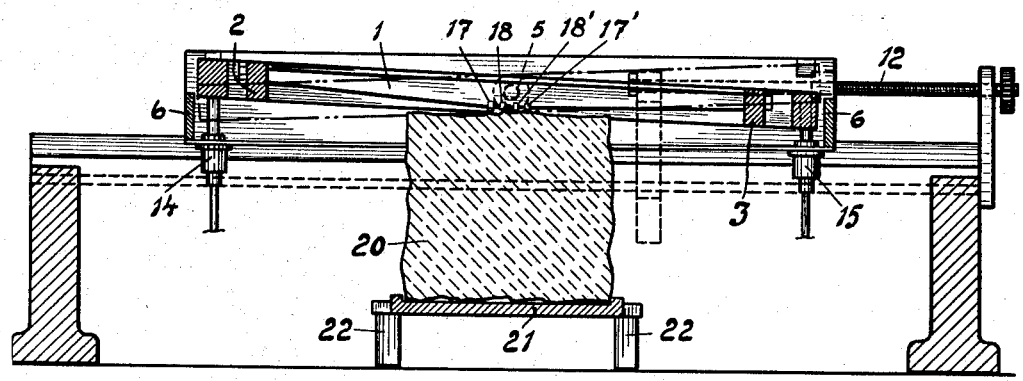
Figure 2:
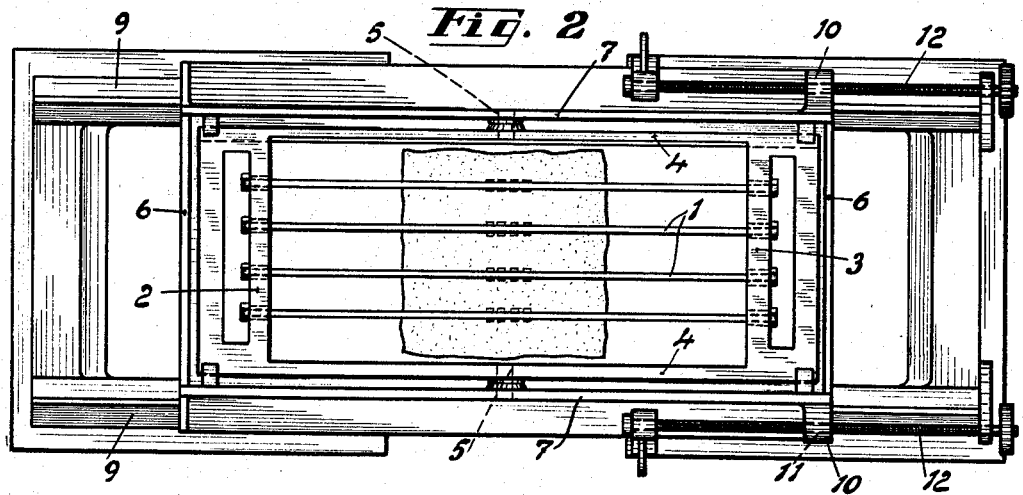
Figure 3:
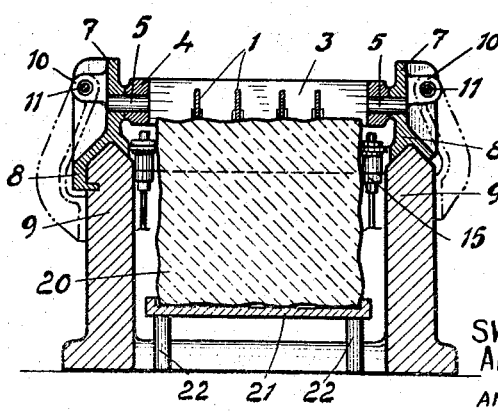

One embodiment of the invention is illustrated in the accompanying drawing, in which:

Figure 1 is a longitudinal section through the machine;
Figure 2 is a plan view;
Figure 3 is a cross section;
Fig. 4 is a further longitudinal section of the present machine with the elements as positioned at the end of a right end sawing stroke;
Fig. 5 is a view similar to Fig. 4 but with the elements positioned at the beginning of a left end sawing stroke;
Fig. 6 is an enlarged, detailed view of the central section of the sawing blade forming part of the present invention;
Fig. 7 is a cross-section view through the outer teeth of the saw blade; and
Fig. 8 is a cross-section view through the medial teeth of the saw blade.

Numeral 1 designates a number of mutually parallel saw blades having a slightly convex lower edge. The saw blades 1 are mounted with their ends secured to the end members 2, 3 of a rectangular frame, the side members 4 of which are provided with laterally projecting pivot pins 5 disposed approximately at the middle of side members 4 and pivotally carried in a rectangular supporting frame surrounding the saw-blade frame 2—4, so that the latter may be rocked or pivoted relative to the supporting frame, the end members and side members of which are indicated at 6 and 7, respectively. The side members 7 are formed with or provided with two slides 8 which are reciprocable along two horizontal parallel guides 9. Each side member 7 of the supporting frame 6, 7 is exteriorly provided with a projecting lug 10 having a threaded opening 11 for a screw spindle 12 which, by means of an electric motor and transmission arrangements not shown in the drawing, is driven in one direction or the other alternately, whereby the supporting frame 6, 7 is given a reciprocating movement along the guides 9.

Adjacent each of its ends, the supporting frame carries a couple of hydraulic jacks 14 and 15, respectively, by means of which the rockable saw-blade frame may be switched from one stop position to the other. The tilting of the saw blade frame is effected by said hydraulic jacks which has the piston ends thereof positioned for pushing against the opposite ends 2 and 3 of the pivoted saw blade frame. The jacks are connected in any known manner (not shown) to a source of pressure medium whereby the piston of one jack is lowered as the piston of the other jack is raised simultaneously with the reversal of rotation of the screw spindle 12. The tilt angle of the saw blade frame is limited by stops 23 mounted on the outer frame 6, 7 above the ends 2, 3 of the saw blade frame. Approximately at the middle of the lower edge of each saw blade 1 there are provided two sets of hard-metal cutter teeth distributed longitudinally of the blade, each set comprising two teeth 17, 18 and 17′, 18′, respectively. The cutter teeth are so disposed, that when the saw-blade frame is situated in one stop position one of the sets of cutter teeth will be situated at a somewhat lower level than the other set and vice versa. Thus, in the stop position of the saw-blade frame indicated in full lines in Figure 1, the cutter teeth 17′, 18′ are situated at a slightly lower level than the teeth 17, 18, while in the other stop position, in which the saw-blade frame 2—4 is swung into the position indicated in broken lines in Figure 1, the condition is reversed. The workpiece 20 is placed upon a platform 21 which is supported by hydraulic or any other kind of jacks 22 by means of which the workpiece may be raised towards the saw blades. The reciprocating movement of the supporting frame 6, 7 caused by the screws 12 is such, that at each stroke the frame 6, 7 travels a distance which is somewhat greater than the dimension of the workpiece longitudinally of the saw blades, so that, at the end of each stroke, the cutter teeth are completely removed from the grooves cut in the workpiece by the teeth. The pressure medium inlets and outlets of the jacks 14, 15 are adjusted, by governing means not shown in the drawing, in such a way, that the switching of the saw-blade frame from one stop position to the other takes place at the turning point of the supporting frame 6, 7, when the cutter teeth are removed from the grooves cut in the workpiece. In the stop position of the saw-blade frame 2—4 shown in full lines in Figure 1, the supporting frame 6, 7 performs a stroke towards the right according to the figure.

The invention is not limited to the embodiment hereinbefore described and as shown in the accompanying drawing, said embodiment being susceptible of various modifications within the scope of the invention.

What we claim is:

1. An improvement in stone-sawing machines comprising a supporting frame, means for slidably supporting and guiding said frame for longitudinal and reciprocating movement in a fixed plane, means for reciprocating said supporting frame, a saw frame pivotally connected at medial portions thereof to said supporting frame, at least one saw blade positioned longitudinally of said supporting frame with its ends connected to said saw frame, said saw blade having two sets of hard metal cutter teeth so positioned that one of said sets engages the stone to be cut when said supporting frame is moving in one direction and the other set engages said stone when said supporting frame is moving in the opposite direction, means for pivoting said saw frame and means for limiting the pivoting of said saw frame to positions engaging one of said sets of cutter teeth with the stone during the entire movement of said supporting frame in one direction.

2. An improvement in stone-sawing machines as claimed in claim 1 wherein said limiting means comprises stops provided on said supporting frame positioned for being contacted by said saw frame during the pivoting thereof limiting said pivoting.

References Cited in the file of this patent

UNITED STATES PATENTS

| 936,748 | Wallner | Oct. 12, 1909 |
| 1,043,775 | Koons | Nov. 5, 1912 |
| 1,609,651 | McMillan | Dec. 7, 1926 |

FOREIGN PATENTS

| 320,788 | France | Aug. 23, 1902 |